United States Patent
Suzuki et al.

(10) Patent No.: US 9,338,416 B2
(45) Date of Patent: May 10, 2016

(54) DISCHARGE LAMP DRIVING DEVICE, LIGHT SOURCE DEVICE, PROJECTOR, AND DISCHARGE LAMP DRIVING METHOD

(71) Applicant: SEIKO EPSON CORPORATION, Tokyo (JP)

(72) Inventors: Junichi Suzuki, Matsumoto (JP); Yoichi Nakagomi, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/636,944

(22) Filed: Mar. 3, 2015

(65) Prior Publication Data

US 2015/0264786 A1 Sep. 17, 2015

(30) Foreign Application Priority Data

Mar. 11, 2014 (JP) ................................. 2014-047295

(51) Int. Cl.
*H05B 41/392* (2006.01)
*H04N 9/31* (2006.01)
*G03B 21/00* (2006.01)
*H05B 41/288* (2006.01)

(52) U.S. Cl.
CPC .............. *H04N 9/312* (2013.01); *G03B 21/005* (2013.01); *H05B 41/2883* (2013.01); *H05B 41/3928* (2013.01)

(58) Field of Classification Search
CPC ........... H05B 41/2883; H05B 41/3928; H05B 41/2928; H05B 41/36; G03B 21/2026; G03B 21/005; G03B 21/2053
USPC ...... 315/209 R, 224, 246, 287, 291, 307, 308
See application file for complete search history.

(56) References Cited

U.S. PATENT DOCUMENTS

| | | | |
|---|---|---|---|
| 492,374 A | 2/1893 | Smyser | |
| 7,023,144 B2 * | 4/2006 | Suzuki | ..................... H01J 61/20 315/246 |
| 8,237,378 B2 * | 8/2012 | Terashima | ......... H05B 41/2988 315/200 R |
| 8,269,424 B2 * | 9/2012 | Terashima | ......... H05B 41/2883 315/246 |
| 8,400,068 B2 | 3/2013 | Terashima | |
| 8,853,961 B2 * | 10/2014 | Terashima | ......... H05B 41/2928 315/246 |
| 2005/0206326 A1 | 9/2005 | Suzuki et al. | |

(Continued)

FOREIGN PATENT DOCUMENTS

| | | |
|---|---|---|
| JP | H01112698 A | 5/1989 |
| JP | 2006059790 A | 3/2006 |

(Continued)

*Primary Examiner* — Douglas W Owens
*Assistant Examiner* — Thai Pham
(74) *Attorney, Agent, or Firm* — Oliff PLC

(57) ABSTRACT

A discharge lamp driving device includes: a discharge lamp driving unit that supplies a driving current to the discharge lamp; and a control unit that controls the discharge lamp driving unit. The driving current having driving periods is supplied, the driving period including: a mixing period which alternately has an AC period in which an alternating current is supplied and a first DC period in which a direct current is supplied, a second DC period which is provided immediately after the mixing period and in which a direct current having a polarity which is the same as that of the direct current in the first DC period is supplied, and a third DC period which is provided immediately after the second DC period and in which a direct current having a polarity opposite to that of the direct current in the second DC period is supplied.

18 Claims, 6 Drawing Sheets

(56) References Cited

U.S. PATENT DOCUMENTS

| | | |
|---|---|---|
| 2011/0012524 A1 | 1/2011 | Terashima |
| 2011/0012525 A1 | 1/2011 | Terashima |
| 2012/0043904 A1 | 2/2012 | Terashima |

FOREIGN PATENT DOCUMENTS

| | | |
|---|---|---|
| JP | 2011023154 A | 2/2011 |
| JP | 2011023288 A | 2/2011 |
| JP | 2012043678 A | 3/2012 |

* cited by examiner

DISCHARGE LAMP DRIVING DEVICE, LIGHT SOURCE DEVICE, PROJECTOR, AND DISCHARGE LAMP DRIVING METHOD

BACKGROUND

1. Technical Field

The present invention relates to a discharge lamp driving device, a light source device, a projector, and a discharge lamp driving method.

2. Related Art

It is known that melting and solidifying of an electrode is repeated by making the temperature of an electrode of a discharge lamp fluctuate, and growth of a projection, which is a starting point of discharge, formed on a tip of the electrode can be controlled.

As a method of controlling the growth of such a projection, a method of driving a discharge lamp alternately supplying the direct current and the alternating current to a discharge lamp has been proposed (For example, JP-A-2011-23154).

The growth of a projection on the tip of the electrode becomes easily controlled as the fluctuation in temperature of the electrode is made to be large. However, in the driving method described above, the growth of a projection on the tip of the electrode is unlikely to be appropriately controlled in some cases due to the reason that the fluctuation in temperature may not be made to be sufficiently large. Accordingly, in the driving method described above, the growth of a projection is suppressed and, as a result, a service life of a discharge lamp is shortened in some cases.

SUMMARY

An advantage of some aspects of the invention is to provide a discharge lamp driving device capable of making the temperature of an electrode fluctuate largely, a light source device using such a discharge lamp driving device, a projector using such a light source device, and a method of driving a discharge lamp capable of making the temperature of an electrode fluctuate largely.

An aspect of the invention is directed to a discharge lamp driving device including: a discharge lamp driving unit that supplies a driving current for driving a discharge lamp to the discharge lamp; and a control unit that controls the discharge lamp driving unit, wherein the control unit controls the discharge lamp driving unit such that the driving current having driving periods is supplied to the discharge lamp, the driving period including: a mixing period which alternately has an AC period in which an alternating current is supplied to the discharge lamp and a first DC period in which a direct current is supplied to the discharge lamp, a second DC period which is provided immediately after the mixing period and in which a direct current having a polarity which is the same as that of the direct current in the first DC period is supplied to the discharge lamp, and a third DC period which is provided immediately after the second DC period and in which a direct current having a polarity opposite to that of the direct current in the second DC period is supplied to the discharge lamp, and the length of the second DC period is longer than the length of the first DC period and the length of the third DC period is longer than or equal to the length of the first DC period and shorter than the length of the second DC period.

According to the discharge lamp driving device of the aspect of the invention, the second DC period for which the direct current having a polarity which is the same as that of the direct current of the first DC period in the mixing period is supplied to the discharge lamp is provided immediately after the mixing period. Accordingly, the temperature of the electrode which is increased in the mixing period is further drastically increased in the second DC period. Further, the third DC period for which the direct current having a polarity opposite to that of the direct current in the second DC period is supplied to the discharge lamp is provided immediately after the second DC period. In this manner, the temperature of the electrode in the third DC period is drastically decreased. Therefore, according to the aspect of the discharge lamp driving device of the invention, since the third DC period for which the temperature of the electrode is drastically decreased is provided immediately after the second DC period for which the temperature of the electrode is drastically increased, the fluctuation in temperature of the electrode can be made large.

In the discharge lamp driving device, the driving current may have a plurality of the driving periods, and the direct currents in the first DC periods of the adjacent driving periods may have different polarities from each other.

According to this configuration, the fluctuation in temperature of both electrodes can be made large.

The length of the first DC period may be shorter than the length of the AC period, longer than the length of a half cycle of the alternating current in the AC period, and may be shorter than the length of the second DC period.

According to this configuration, while the electrode is heated during the mixing period, it is possible to prevent a projection on the tip portion of the electrode from being extremely melted.

The length of the first DC period may be equal to or greater than 0.5 ms and equal to or less than 7.0 ms.

According to this configuration, while the electrode is heated during the mixing period, it is possible to prevent a projection on the tip portion of the electrode from being extremely melted.

The length of the first DC period may be equal to or greater than 1.0 ms and equal to or less than 5.0 ms.

According to this configuration, it is possible to increase the temperature of the electrode more preferably in the mixing period.

The number of the first DC periods included in the mixing period may be equal to or greater than 5 and equal to or less than 50.

According to this configuration, it is possible to increase the temperature of the electrode more preferably in the mixing period.

A frequency of the alternating current in the AC period may be equal to or greater than 1 kHz.

According to this configuration, it is possible to prevent a fluctuation in temperature of the electrode in the AC period.

The length of the AC period may be equal to or greater than 1 cycle and equal to or less than 20 cycles.

According to this configuration, it is possible to prevent the temperature of the electrode from being drastically increased in the mixing period.

Another aspect of the invention is directed to a light source device including: a discharge lamp that emits light, and the discharge lamp driving device described above.

According to the light source device of the aspect of the invention, since the above-described discharge lamp driving device is included, a light source device capable of making the fluctuation in temperature of the electrode large can be obtained.

Still another aspect of the invention is directed to a projector including: the light source device described above; a light modulation element that modulates light emitted from the light source device according to a video signal; and a projection optical system that projects the light modulated by the light modulation element.

According to the projector of the aspect of the invention, since the above-described light source device is included, a projector with excellent reliability can be obtained.

Yet another aspect of the invention is directed to a method of driving a discharge lamp that is driven by supplying a driving current to the discharge lamp, the method including: supplying the driving current having driving periods to the discharge lamp, the driving period including: a mixing period which alternately has an AC period in which an alternating current is supplied to the discharge lamp and a first DC period in which a direct current is supplied to the discharge lamp, a second DC period which is provided immediately after the mixing period and in which a direct current having a polarity which is the same as that of the direct current in the first DC period is supplied to the discharge lamp, and a third DC period which is provided immediately after the second DC period and in which a direct current having a polarity opposite to that of the direct current in the second DC period is supplied to the discharge lamp, wherein the length of the second DC period is longer than the length of the first DC period, and the length of the third DC period is longer than or equal to the length of the first DC period and shorter than the length of the second DC period.

According to the method of driving a discharge lamp of the aspect of the invention, it is possible to make the fluctuation in temperature of the electrode large in the same manner as described above.

The driving current may have a plurality of the driving periods, and the direct currents in the first DC periods of the adjacent driving periods may have different polarities from each other.

According to the method with this configuration, the fluctuation in temperature of both electrodes can be made large.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
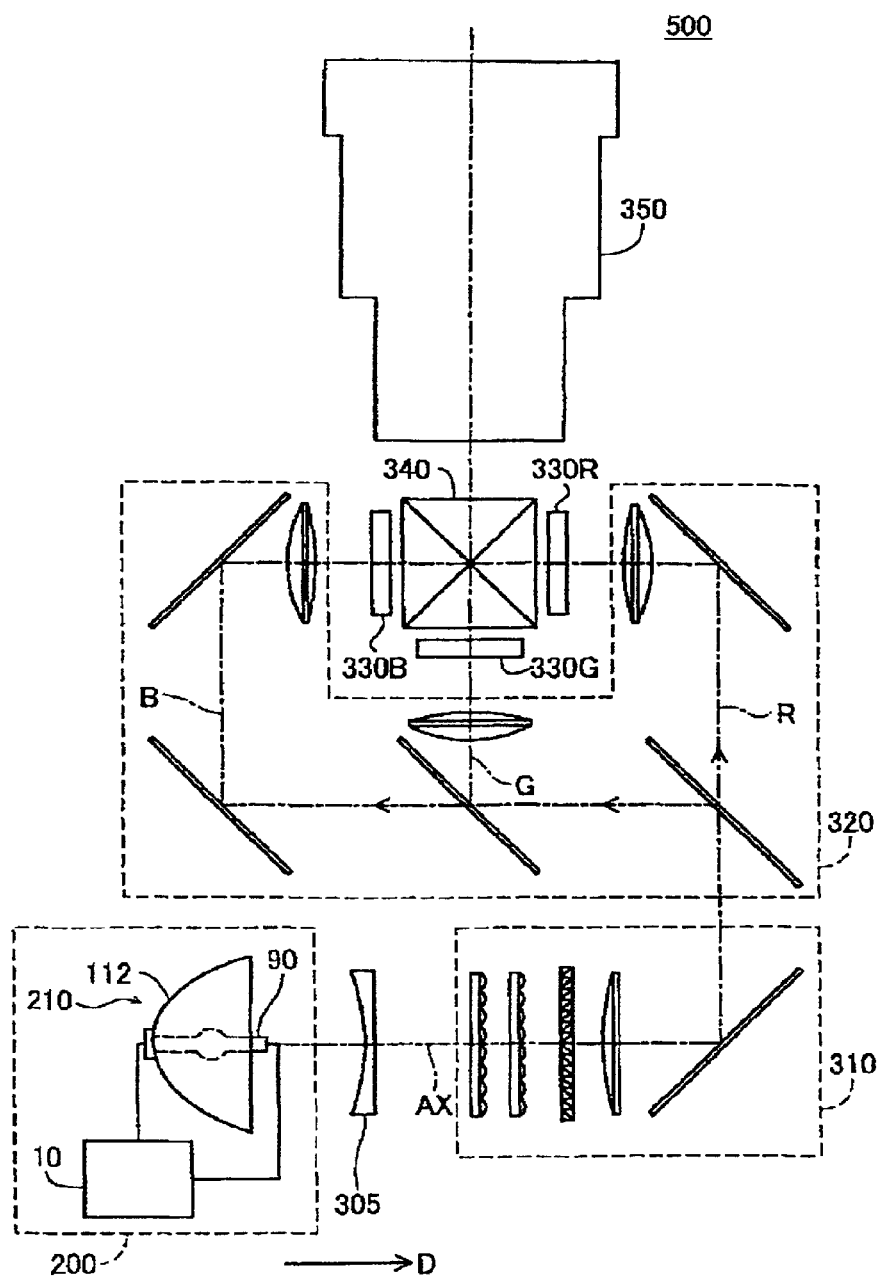
FIG. 1 is a view schematically illustrating a configuration of a projector according to the present embodiment.

Hereinafter, a projector according to an embodiment of the invention will be described with reference to the accompanying drawings.

Further, the range of the invention is not limited to the embodiments described below and can be arbitrarily changed within the range of the technical scope of the invention. In addition, for the sake of easy description of each configuration, in the drawings below, the scales or the numerical values of each structure may be different from those of the actual structure.

As illustrated in FIG. 1, a projector 500 of the present embodiment includes a light source device 200, a collimating lens 305, an illumination optical system 310, a color separation optical system 320, three liquid crystal light valves (light modulation elements) 330R, 330G, and 330B, a cross dichroic prism 340, and a projection optical system 350.

Light emitted from the light source device 200 passes through the collimating lens 305 and is incident on the illumination optical system 310. The collimating lens 305 has a function of collimating light from the light source device 200.

The illumination optical system 310 has a function of adjusting illumination of light emitted from the light source device 200 such that the illumination becomes uniform on the liquid crystal light valves 330R, 330G, and 330B. The illumination optical system 310 has a function of aligning polarization directions of light emitted from the light source device 200 to one direction. The reason is that the light emitted from the light source device 200 is effectively used in the liquid crystal light valves 330R, 330G, and 330B.

Light whose illuminance distribution and polarization direction are adjusted is incident to the color separation optical system 320. The color separation optical system 320 separates the incident light into three colored light beams of red light (R), green light (G), and blue light (B). Three colored light beams are modulated by the liquid crystal light valves 330R, 330G, and 330B in correspondence to respective colors. The liquid crystal light valves 330R, 330G, and 330B include liquid crystal panels 560R, 560G, and 560B, and polarizing plates (not illustrated) described below. The polarizing plates are arranged on respective light incident sides and light emitting sides of the liquid crystal panels 560R, 560G, and 560B.

The modulated three colored light beams are synthesized by the cross dichroic prism 340. The synthetic light is incident on the projection optical system 350. The projection optical system 350 projects the incident light on a screen 700 (see FIG. 3). In this manner, video is displayed on the screen 700. Further, as each of the configurations of the collimating lens 305, the illumination optical system 310, the color separation optical system 320, the cross dichroic prism 340, and the projection optical system 350, various known configurations can be employed.

Figure 2:
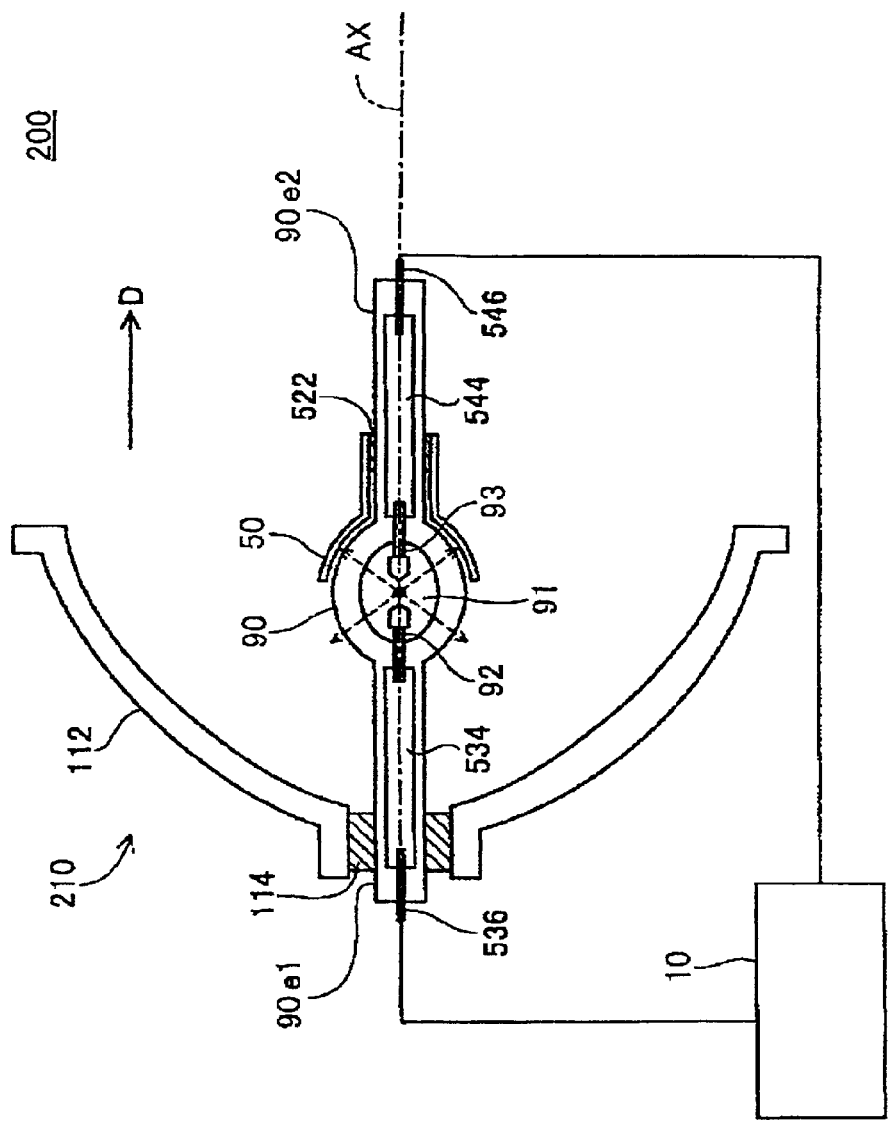
FIG. 2 is a view illustrating a discharge lamp according to the present embodiment.

FIG. 2 is a view illustrating the configuration of the light source device 200. The light source device 200 includes a light source unit 210 and a discharge lamp lighting device (discharge lamp driving device) 10. FIG. 2 is a cross-sectional view illustrating the light source unit 210. The light source unit 210 includes a main reflecting mirror 112, a discharge lamp 90, and a sub-reflecting mirror 50.

The discharge lamp lighting device 10 supplies a driving current (driving power) to the discharge lamp 90 and lights the discharge lamp 90. The main reflecting mirror 112 reflects light discharged from the discharge lamp 90 toward an irradiation direction D. The irradiation direction D is parallel with an optical axis AX of the discharge lamp 90.

The discharge lamp 90 has a rod shape extending along the irradiation direction D. One end portion (end portion on the left side of the figure) of the discharge lamp 90 is set as a first end portion 90e1 and another end portion (end portion on the right side of the figure) of the discharge lamp 90 is set as a second end portion 90e2. As materials of the discharge lamp 90, translucent materials such as quartz glass and the like are used. The middle portion of the discharge lamp 90 is swollen in a spherical shape and the inside thereof is a discharge space 91. In the discharge space 91, gas which is a discharge medium containing rare gas and a metal halogen compound is sealed.

Tips of a first electrode 92 and a second electrode 93 protrude in the discharge space 91. The first electrode 92 is arranged on the first end portion 90e1 side of the discharge space 91. The second electrode 93 is arranged on the second end portion 90e2 side of the discharge space 91. The shape of the first electrode 92 and the second electrode 93 is a rod shape along the optical axis AX. The tip portions of the first electrode 92 and the second electrode 93 are arranged in the discharge space 91 such that the tip portions thereof are separated from each other by a predetermined distance and face each other. The materials of the first electrode 92 and the second electrode 93 are metals such as tungsten.

A first terminal 536 is provided on the first end portion 90e1 of the discharge lamp 90. The first terminal 536 and the first electrode 92 are electrically connected by a conductive member 534 penetrating the inside of the discharge lamp 90. In the same manner, a second terminal 546 is provided on the second end portion 90e2 of the discharge lamp 90. The second terminal 546 and the second electrode 93 are electrically connected by a conductive member 544 penetrating the inside of the discharge lamp 90. The materials of the first terminal 536 and the second terminal 546 are, for example, metals such as tungsten. As the materials of the conductive members 534 and 544, molybdenum foil can be used.

The first terminal 536 and the second terminal 546 are connected to the discharge lamp lighting device 10. The discharge lamp lighting device 10 supplies the driving current for driving the discharge lamp 90 to the first terminal 536 and the second terminal 546. As a result, arc discharge occurs between the first electrode 92 and the second electrode 93. The light (discharge light) generated due to the arc discharge is radiated toward all directions from a discharge position as indicated by a dashed arrow.

The main reflecting mirror 112 is fixed to the first end portion 90e1 of the discharge lamp 90 by a fixing member 114. The main reflecting mirror 112 reflects light among discharge light, which travels toward the opposite side of the irradiation direction D, toward the irradiation direction D. The shape of the reflecting surface (surface on the discharge lamp 90 side) of the main reflecting mirror 112 is not particularly limited as long as discharge light can be reflected toward the irradiation direction D, and examples thereof include a spheroidal shape and a rotary parabolic shape. For example, in the case where the shape of the reflecting surface of the main reflecting mirror 112 is set as a rotary parabolic shape, the main reflecting mirror 112 can convert discharge light into light approximately parallel to the optical axis AX. In this manner, the collimating lens 305 can be omitted.

The sub-reflecting mirror 50 is fixed to the second end portion 90e2 side of the discharge lamp 90 by a fixing member 522. The shape of the reflecting surface (surface of the discharge lamp 90 side) of the sub-reflecting mirror 50 is a spherical surface shape surrounding a portion of the second end portion 90e2 side of the discharge space 91. The sub-reflecting mirror 50 reflects light among discharge light, which travels toward the opposite side of the side on which the main reflecting mirror 112 is arranged, toward the main reflecting mirror 112. In this manner, utilization efficiency of light radiated from the discharge space 91 can be improved.

The materials of the fixing member 114 and 522 are not particularly limited as long as the materials are heat-resistant materials withstanding generation of heat from the discharge lamp 90, and an inorganic adhesive can be exemplified. As a method of fixing the arrangement of the discharge lamp 90 with the main reflecting mirror 112 and the sub-reflecting mirror 50, an arbitrary method can be employed without limiting a method of fixing the main reflecting mirror 112 and the sub-reflecting mirror 50 to the discharge lamp 90. For example, the discharge lamp 90 and the main reflecting mirror 112 may be independently fixed to a housing (not illustrated) of the projector 500. The same applies to the sub-reflecting mirror 50.

Hereinafter, a circuit configuration of the projector 500 will be described.

Figure 3:
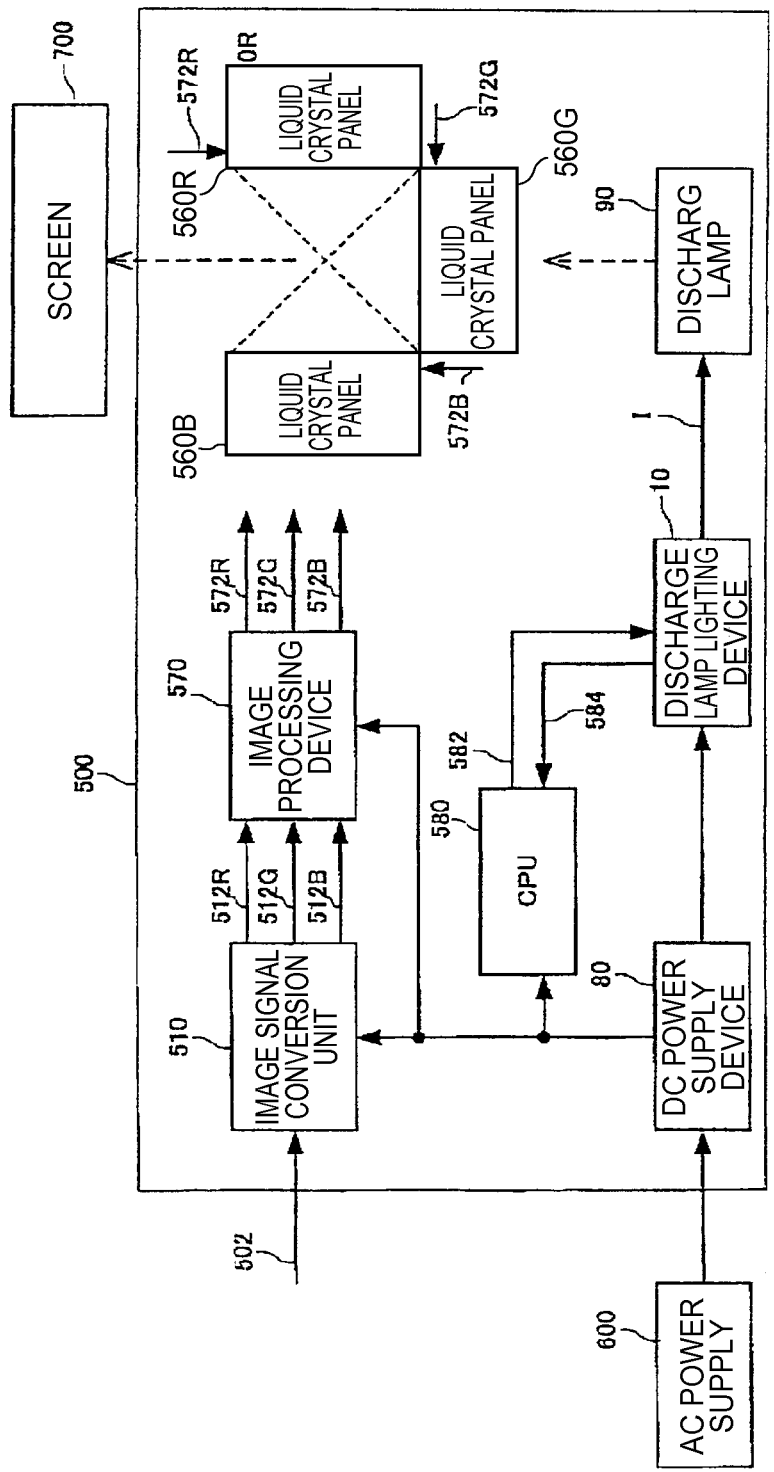
FIG. 3 is a block diagram illustrating various kinds of constituent elements of the projector according to the present embodiment.

FIG. 3 is a view illustrating an example of a circuit configuration of the projector 500 according to the present embodiment. The projector 500 includes an image signal conversion unit 510, a DC power supply device 80, the liquid crystal panels 560R, 560G, and 560B, an image processing device 570, and a central processing unit (CPU) 580 in addition to the optical system illustrated in FIG. 1.

The image signal conversion unit 510 generates image signals 512R, 512G, and 512B by converting an image signal 502 (a brightness-color difference signal or an analog RGB signal) input from the outside into a digital RGB signal having a predetermined word length and supplies the generated signals to the image processing device 570.

The image processing device 570 performs image processing with respect to three image signals 512R, 512G, and 512B respectively. The image processing device 570 supplies driving signals 572R, 572G, and 572B for respectively driving the liquid crystal panels 560R, 560G, and 560B to the liquid crystal panels 560R, 560G, and 560B.

The DC power supply device 80 converts an AC voltage supplied from an external AC power supply 600 into a constant DC voltage. The DC power supply device 80 supplies the DC voltage to the image signal conversion unit 510 and the image processing device 570 positioned on the secondary side of a transformer (not illustrated and included in the DC power supply device 80) and to the discharge lamp lighting device 10 positioned on the primary side of the transformer.

The discharge lamp lighting device 10 generates a high voltage between the electrodes of the discharge lamp 90 at startup and causes insulation breakdown to form a discharge path. Subsequently, the discharge lamp lighting device 10 supplies a driving current I for the discharge lamp 90 maintaining discharge.

The liquid crystal panels 560R, 560G, and 560B are respectively included in the above-described liquid crystal light valves 330R, 330G, and 330B. The liquid crystal panels 560R, 560g, and 560B modulate transmittance (brightness) of colored light incident on respective liquid crystal panels 560R, 560G, and 560B through the above-described optical system based on respective driving signals 572R, 572G, and 572B.

The CPU 580 controls various operations from the start of lighting of the projector 500 to turning the light off. For example, in the example of FIG. 3, a light-on instruction or a light-off instruction is output to the discharge lamp lighting device 10 through a communication signal 582. The CPU 580 receives lighting information of the discharge lamp 90 through the communication signal 584 from the discharge lamp lighting device 10.

Hereinafter, the configuration of the discharge lamp lighting device 10 will be described.

Figure 4:
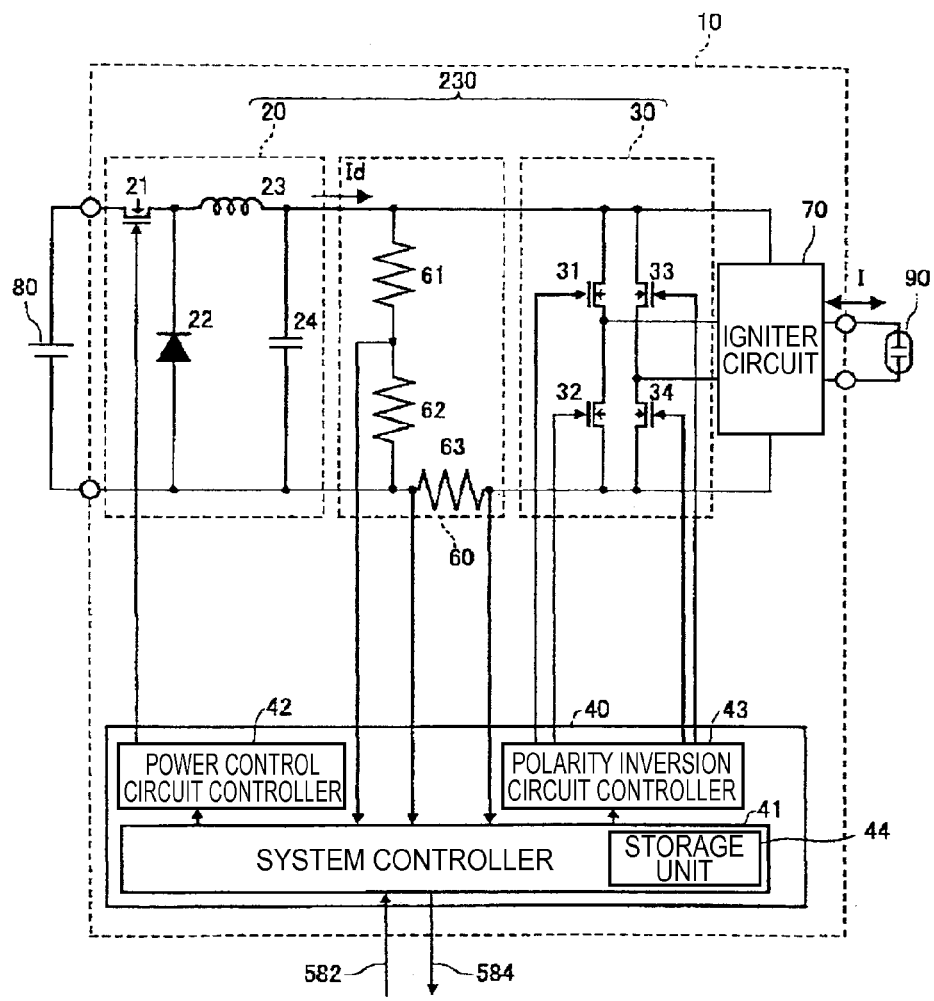
FIG. 4 is a circuit diagram of a discharge lamp lighting device of the present embodiment.

FIG. 4 is a view illustrating an example of a circuit configuration of the discharge lamp lighting device 10.

The discharge lamp lighting device 10 includes a power control circuit 20, a polarity inversion circuit 30, a control unit 40, an operation detecting unit 60, and an igniter circuit 70 as illustrated in FIG. 4.

The power control circuit 20 generates driving power supplied to the discharge lamp 90. In the present embodiment, the power control circuit 20 is configured of a step down chopper circuit that inputs a voltage from the DC power supply device 80 and outputs a direct current Id by lowering the input voltage.

The power control circuit 20 includes a switch element 21, a diode 22, a coil 23, and a capacitor 24. The switch element 21 is configured of, for example, a transistor. In the present embodiment, one end of the switch element 21 is connected to a positive voltage side of the DC power supply device 80 and another end is connected to a cathode terminal of the diode 22 and one end of the coil 23.

One end of the capacitor 24 is connected to the other end of the coil 23 and the other end of the capacitor 24 is connected to an anode terminal of the diode 22 and a negative voltage side of the DC power supply device 80. A current control signal is input to a control terminal of the switch element 21 from the control unit 40 described below so that ON/OFF of the switch element 21 is controlled. As the current control signal, for example, a pulse width modulation (PWM) control signal may be used.

When the switch element 21 is turned ON, the current flows in the coil 23 and energy is stored in the coil 23. Next, when the switch element 21 is turned OFF, the energy stored in the coil 23 is released through a path passing through the capacitor 24 and the diode 22. As a result, a direct current Id is generated according to a ratio of an ON-time of the switch element 21.

The polarity inversion circuit 30 inverts the polarity of the direct current Id input from the power control circuit 20 at a predetermined timing. In this manner, the polarity inversion circuit 30 generates a driving current I which is a direct current continuing for a controlled amount of time or a driving current I which is an alternating current having an arbitrary frequency and outputs the current. In the present embodiment, the polarity inversion circuit 30 is configured of an inverter bridge circuit (full-bridge circuit).

The polarity inversion circuit 30 includes a first switch element 31, a second switch element 32, a third switch element 33, and a fourth switch element 34 configured of a transistor or the like. The polarity inversion circuit 30 has a configuration in which the first switch element 31 and the second switch element 32 connected in series to each other and the third switch element 33 and the fourth switch element 34 connected in series to each other are connected in parallel with each other. Polarity inversion control signals are respectively input to control terminals of the first switch element 31, the second switch element 32, the third switch element 33, and the fourth switch element 34 from the control unit 40. An ON/OFF operation of the first switch element 31, the second switch element 32, the third switch element 33, and the fourth switch element 34 is controlled based on the polarity inversion control signals.

In the polarity inversion circuit 30, an operation of alternately turning ON and OFF the first switch element 31 and the fourth switch element 34, and the second switch element 32 and the third switch element 33 is repeatedly performed. In this manner, the polarity of the direct current Id output from the power control circuit 20 is alternately inverted. The polarity inversion circuit 30 generates a driving current I which is a direct current that maintains the same polarity state for a controlled amount of time or a driving current I that is an alternating current having a controlled frequency from a common connection point between the first switch element 31 and the second switch element 32 and a common connection point between the third switch element 33 and the fourth switch element 34 and outputs the current.

That is, the polarity inversion circuit 30 is controlled such that the second switch element 32 and the third switch element 33 are turned OFF when the first switch element 31 and the fourth switch element 34 are turned ON and the second switch element 32 and the third switch element 33 are turned ON when the first switch element 31 and the fourth switch element 34 are turned OFF. Accordingly, when the first switch element 31 and the fourth switch element 34 are turned ON, a driving current I flowing through one end of the capacitor 24, the first switch element 31, the discharge lamp 90, and the fourth switch element 34 in order is generated. When the second switch element 32 and the third switch element 33 are turned ON, a driving current I flowing through one end of the capacitor 24, the third switch element 33, the discharge lamp 90, and the second switch element 32 in order is generated.

In the present embodiment, a portion combining the power control circuit 20 and the polarity inversion circuit 30 corresponds to the discharge lamp driving unit 230. That is, the discharge lamp driving unit 230 supplies the driving current I driving the discharge lamp 90 to the discharge lamp 90.

The control unit 40 controls the discharge lamp driving unit 230. In the example of FIG. 4, the control unit 40 controls a retention time for which the driving current I maintains the same polarity, the current value of the driving current I, the frequency, and the like by controlling the power control circuit 20 and the polarity inversion circuit 30. The details will be described below.

The control unit 40 performs polarity inversion control of controlling the retention time for which the driving current I maintains the same polarity, the frequency of the driving current I, and the like with respect to the polarity inversion circuit 30 at a polarity inversion timing of the driving current I. Further, the control unit 40 performs current control of controlling the current value of the direct current Id to be output with respect to the power control circuit 20.

The configuration of the control unit 40 is not particularly limited. In the present embodiment, the control unit 40 includes a system controller 41, a power control circuit controller 42, and a polarity inversion circuit controller 43. Further, a part or the entire control unit 40 may be configured of a semiconductor integrated circuit.

The system controller 41 controls the power control circuit 20 and the polarity inversion circuit 30 by controlling the power control circuit controller 42 and the polarity inversion circuit controller 43. The system controller 41 may control the power control circuit controller 42 and the polarity inversion circuit controller 43 based on the lamp voltage detected by the operation detecting unit 60 and the driving current I.

In the present embodiment, the system controller 41 includes a storage unit 44. The storage unit 44 may be provided independently from the system controller 41.

The system controller 41 may control the power control circuit 20 and the polarity inversion circuit 30 based on information stored in the storage unit 44. Further, information related to driving parameters such as the retention time for which the driving current I maintains the same polarity, the current value of the driving current I, the frequency, the waveform, and a modulation pattern may be stored in the storage unit 44.

The power control circuit controller 42 controls the power control circuit 20 by outputting a current control signal to the power control circuit 20 based on the control signal from the system controller 41.

The polarity inversion circuit controller 43 controls the polarity inversion circuit 30 by outputting a polarity inversion control signal to the polarity inversion circuit 30 based on the control signal from the system controller 41.

The control unit 40 can perform the above-described control and various controls of processes described below by being realized using a dedicated circuit. The control unit 40 functions as a computer by the CPU executing control programs stored in the storage unit 44 and can perform various controls of these processes.

Figure 5:
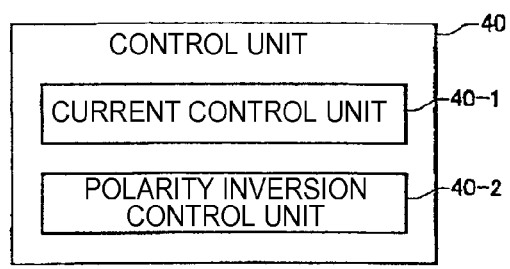
FIG. 5 is a block diagram illustrating an example of a configuration of a control unit according to the present embodiment.

FIG. 5 is a view for describing another example of the configuration of the control unit 40. As illustrated in FIG. 5, the control unit 40 may be configured so as to function as a current control unit 40-1 that controls the power control circuit 20 and as a polarity inversion control unit 40-2 that controls the polarity inversion circuit 30 using control programs.

In the example illustrated in FIG. 4, the control unit 40 is configured as a part of the discharge lamp lighting device 10. Meanwhile, some of the functions of the control unit 40 may be carried out by the CPU 580.

The operation detecting unit 60 may include a voltage detecting unit that detects the lamp voltage of the discharge lamp 90 and outputs driving voltage information to the control unit 40 and a current detecting unit that detects the driving current I and outputs driving current information to the control unit 40. In the present embodiment, the operation detecting unit 60 includes a first resistor 61, a second resistor 62, and a third resistor 63.

In the present embodiment, the voltage detecting unit detects the lamp voltage using a voltage divided by the first resistor 61 and the second resistor 62 which are connected in parallel with the discharge lamp 90 and connected to each other in series. Further, in the present embodiment, the current detecting unit detects the driving current I using a voltage generated in the third resistor 63 connected to the discharge lamp 90 in series.

The igniter circuit 70 is only operated at the start of lighting of the discharge lamp 90. The igniter circuit 70 supplies a high voltage (a voltage higher than the voltage at normal lighting of the discharge lamp 90) necessary for forming a discharge path by causing insulation breakdown between electrodes (between the first electrode 92 and the second electrode 93) of the discharge lamp 90 at the start of lighting of the discharge lamp 90 to a portion between electrodes of the discharge lamp 90 (between the first electrode 92 and the second electrode 93). In the present embodiment, the igniter circuit 70 is connected to the discharge lamp 90 in parallel.

Hereinafter, a relationship between the polarity of the driving current I and the temperature of the electrodes will be described.

Figure 6A:
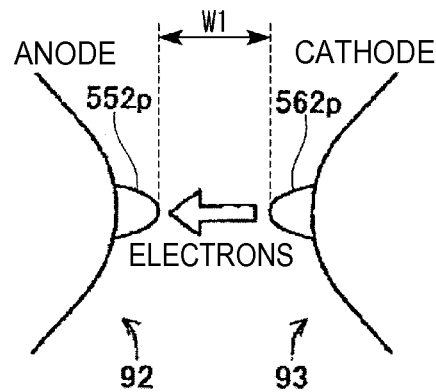
FIGS. 6A and 6B are views illustrating states of projections on tip ends of electrodes of the discharge lamp.
Figure 6B:
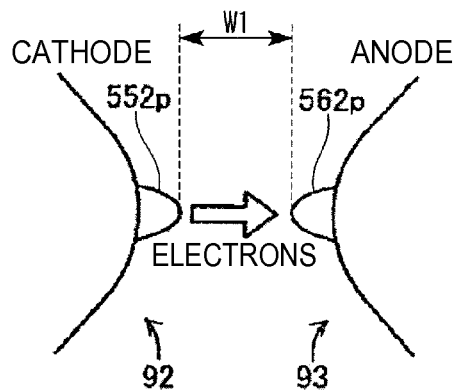

FIGS. 6A and 6B are views illustrating an operation state of the first electrode 92 and the second electrode 93.

FIGS. 6A and 6B illustrate tip portions of the first electrode 92 and the second electrode 93. A projection 552p and a projection 562p are respectively formed on the tips of the first electrode 92 and the second electrode 93. The discharge generated between the first electrode 92 and the second electrode 93 is mainly generated between the projection 552p and the projection 562p.

FIG. 6A illustrates a first polarity state in which the first electrode 92 is operated as an anode and the second electrode 93 is operated as a cathode. In the first polarity state, electrons are moved due to discharge from the second electrode 93 (cathode) to the first electrode 92 (anode). Electrons are released from the cathode (second electrode 93). The electrons released from the cathode (second electrode 93) collide with the tip of the anode (first electrode 92). Due to this collision, heat is generated so that the temperature of the tip (projection 552p) of the anode (first electrode 92) is increased. Meanwhile, the temperature of the tip (projection 562p) of the cathode (second electrode 93) which is the side of releasing electrons is decreased.

FIG. 6B illustrates a second polarity state in which the first electrode 92 is operated as the cathode and the second electrode 93 is operated as the anode. In the second polarity state, contrary to the first polarity state, electrons are moved from the first electrode 92 to the second electrode 93. As a result, the temperature of the tip (projection 562p) of the second electrode 93 is increased. Meanwhile, the temperature of the tip (projection 552p) of the first electrode 92 is decreased.

As described above, the temperature of the anode with which electrons collide is increased and the temperature of the cathode releasing electrons is decreased. That is, in the first polarity state, the temperature of the first electrode 92 is increased and the temperature of the second electrode 93 is decreased. In the second polarity state, the temperature of the second electrode 93 is increased and the temperature of the first electrode 92 is decreased.

A distance W1 between electrodes of the first electrode 92 and the second electrode 93 is the distance between the projection 552p and the projection 562p. When the distance W1 between electrodes is increased, the lamp voltage of the discharge lamp 90 is increased and the illuminance of the discharge lamp 90 is decreased during constant power driving. For this reason, by controlling the growth of the projection 552p and the projection 562p and maintaining the distance W1 between electrodes, it is possible to suppress a decrease in illuminance of the discharge lamp 90 so that the service life of the discharge lamp 90 can be improved.

Next, control of the discharge lamp driving unit 230 performed by the control unit 40 will be described.

Figures 7A, 7B:
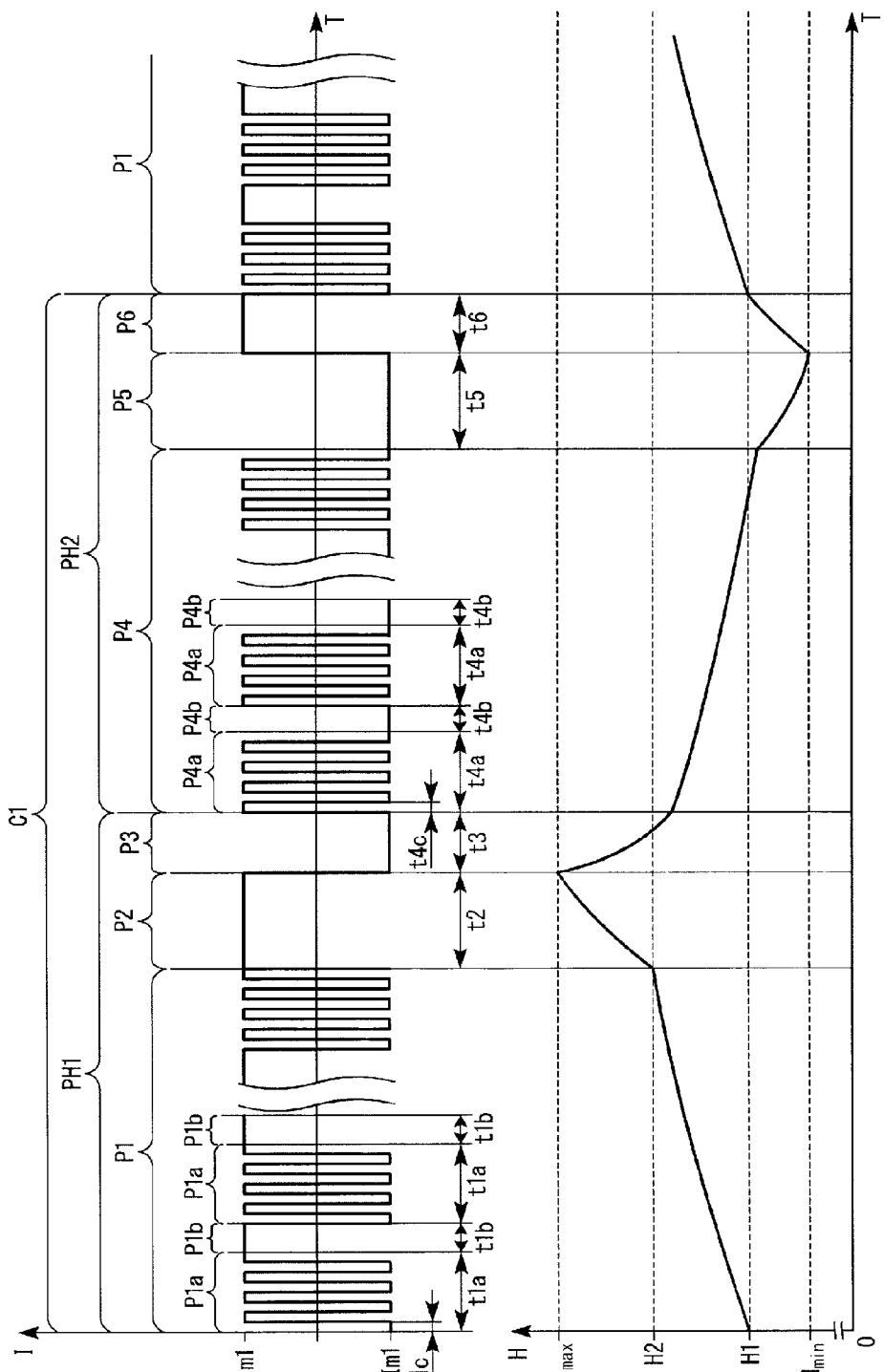
FIGS. 7A and 7B are diagrams illustrating an example of a driving current waveform of the discharge lamp according to the present embodiment.

FIG. 7A is a timing chart showing the driving current I to be supplied to the discharge lamp 90 in the present embodiment. The horizontal axis indicates a time T and the vertical axis indicates a current value of the driving current I. The driving current I indicates the current flowing in the discharge lamp 90. The positive value indicates the first polarity state and the negative value indicates the second polarity state.

FIG. 7B is a graph showing a change in temperature of the first electrode 92 corresponding to FIG. 7A. The horizontal axis indicates the time T and the vertical axis indicates a temperature H of the first electrode 92.

Further, since the temperatures of the first electrode 92 and the second electrode 93 are changed by drawing the same curve except that the changing timing of the first electrode is shifted from the changing timing of the second electrode, only the first electrode 92 is described as a typical example in some cases in the description below.

The control unit 40 controls the discharge lamp driving unit 230 such that the driving current I illustrated in FIG. 7A is supplied to the discharge lamp 90. That is, the control unit 40 controls the discharge lamp driving unit 230 such that a cycle C1 is repeated.

The cycle C1 alternately has a first driving period (driving period) PH1 and a second driving period (driving period) PH2 illustrated in FIG. 7A. The first driving period PH1 is a driving period for which the projection 552P of the first electrode 92 is melted and the second driving period PH2 is a driving period for which the projection 562p of the second electrode 93 is melted.

The first driving period PH1 includes a mixing period P1, a second DC period P2, and a third DC period P3.

The mixing period P1 is a period for which the temperature of the first electrode 92 is gradually increased. The mixing period P1 is a period alternately having an AC period P1a and a first DC period P1b.

The AC period P1a is a period for which the alternating current whose polarity is inverted between a current value Im1 and a current value −Im1 is supplied to the discharge lamp 90 as the driving current I. In the present embodiment, the alternating current in the AC period P1a is a rectangular wave alternating current. The frequency of the alternating current of the AC period P1a can be set to be 1 kHz or more. By setting the frequency of the alternating current in the AC period P1a in this manner, a fluctuation in temperature H of the first electrode 92 in the AC period P1a can be suppressed. The frequency of the alternating current in the AC period P1a may be constant or modulated.

The number of AC periods P1a included in the mixing period P1 is, for example, in the range of 5 to 50, and a length t1a of each AC period P1a is in the range of 1 cycle to 20 cycles. By setting the number and the length thereof in this manner, it is possible to suppress a drastic increase in temperature H of the first electrode 92 in the mixing period P1.

The first DC period P1b is a period for which the direct current of the current value Im1 is supplied to the discharge lamp 90 as the driving current I. In the present embodiment, the direct current in the first DC period P1b is a direct current having the first polarity whose current value is constant (Im1). The number of the first DC periods P1b included in the mixing period P1 is, for example, in the range of 5 to 50. By setting in this manner, it is possible to sufficiently increase the temperature H of the first electrode 92 in the mixing period P1.

In a case where the number of the first DC periods P1b (AC periods P1a) included in the mixing period P1 is less than 5, it is difficult to sufficiently increase the temperature H of the first electrode 92. In addition, in a case where the number of the first DC periods P1b (AC periods P1a) included in the mixing period P1 is more than 50, there is a concern that the projection 552p is extremely melted or a fluctuation in brightness of the discharge lamp 90 is visually recognized and flickering occurs when the mixing period P1 is switched to the second DC period P2.

A length t1b of each first DC period P1b is set such that the length t1b is shorter than the length t1a of the AC period P1a, longer than a length t1c of a half cycle of the AC period P1a, shorter than a length t2 of the second DC period P2, and in the range of 0.5 ms (millisecond) to 7.0 ms. Further, more preferably, the length t1b of the first DC period P1b is set to be in the range of 1 ms to 5.0 ms.

By setting the first DC period P1b in this manner, the temperature H of the first electrode 92 is gradually increased in the mixing period P1.

The second DC period P2 is provided immediately after the mixing period P1 and immediately before the third DC period P3. That is, the second DC period P2 is provided so as to be interposed between the mixing period P1 and the third DC period P3.

The second DC period P2 is a period for which the direct current of the current value Im1 is supplied to the discharge lamp 90 as the driving current I. The polarity of the direct current in the second DC period P2 is the same as that of the direct current in the first DC period P1b. That is, the direct current in the second DC period P2 is a direct current having the first polarity. In the present embodiment, the direct current in the second DC period P2 has a constant current value (Im1).

The length t2 of the second DC period P2 is longer than the length t1b of the first DC period P1b in the mixing period P1. The length t2 of the second DC period P2 is, for example, in the range of 3 ms to 15 ms. By setting the length in this manner, the temperature H of the first electrode 92 can be preferably increased.

The third DC period P3 is provided immediately after the second DC period P2 and immediately before the mixing period P4 in the second driving period PH2 described below. That is, the third DC period P3 is provided so as to be interposed between the second DC period P2 and the mixing period P4.

The third DC period P3 is a period for which the direct current whose current value is −Im1 is supplied to the discharge lamp 90 as the driving current I. The polarity of the direct current in the third DC period P3 is opposite to that of the direct current in the second DC period P2. That is, the direct current in the third DC period P3 is a direct current having the second polarity. In the present embodiment, the direct current in the third DC period P3 has a constant current value (−Im1).

A length t3 of the third DC period P3 is longer than or equal to the length t1b of the first DC period P1b in the mixing period P1 and shorter than the length t2 of the second DC period P2. The length t3 of the third DC period P3 is, for example, in the range of 1 ms to 10 ms. By setting the length in this manner, the temperature H of the first electrode 92 can be preferably decreased.

The second driving period PH2 includes the mixing period P4, a second DC period P5, and a third DC period P6.

The mixing period P4 is a period alternately having an AC period P4a and a first DC period P4b.

The AC period P4a is a period for which the alternating current whose polarity is inverted between the current value Im1 and the current value −Im1 is supplied to the discharge lamp 90 as the driving current I. In the present embodiment, the alternating current in the AC period P4a is a rectangular wave alternating current. The frequency of the alternating current of the AC period P4a can be set to be 1 kHz or more in the same manner as that of the AC period P1a. The frequency of the alternating current in the AC period P4a may be constant or modulated.

The number of AC periods P4a included in the mixing period P4 is, for example, in the range of 5 to 50, and a length t4a of each AC period P4a is in the range of 1 cycle to 20 cycles in the same manner as that of the AC period P1a.

The first DC period P4b is a period for which the direct current having the current value −Im1 is supplied to the discharge lamp 90 as the driving current I. The polarity of the direct current in the first DC period P4b is opposite to that of the direct current in the first DC period P1b of the first driving period PH1. That is, the direct current in the first DC period P4b is a direct current having the second polarity. In other words, the direct currents in the first DC periods in the adjacent driving periods have different polarities from each other. In the present embodiment, the direct current in the first DC period P4b has a constant current value (−Im1).

The number of the AC periods P4a included in the mixing period P4 is, for example, in the range of 5 to 50 in the same manner as that of the AC period P1a.

A length t4b of each first DC period P4b is set such that the length t4b is shorter than the length t4a of the AC period P4a, longer than a length t4c of a half cycle of the AC period P4a, shorter than a length t5 of the second DC period P5, and in the range of 0.5 ms (millisecond) to 7.0 ms. Further, more preferably, the length t4b of the first DC period P4b is set to be in the range of 1 ms to 5.0 ms.

By setting the first DC period P4b in this manner, the temperature H of the second electrode 93 is gradually increased in the mixing period P4.

The second DC period P5 is provided immediately after the mixing period P4 and immediately before the third DC period P6. That is, the second DC period P5 is provided so as to be interposed between the mixing period P4 and the third DC period P6.

The second DC period P5 is a period for which the direct current having the current value −Im1 is supplied to the discharge lamp 90 as the driving current I. The polarity of the direct current in the second DC period P5 is the same as that of the direct current in the first DC period P4b. That is, the direct current in the second DC period P5 is a direct current having the second polarity. The polarity of the direct current in the second DC period P5 is opposite to that of the direct current in the second DC period P2 of the first driving period PH1. In other words, the direct currents in the second DC periods in the adjacent driving periods have different polarities from each other. In the present embodiment, the direct current in the second DC period P5 has a constant current value (−Im1).

The length t5 of the second DC period P5 is, for example, in the range of 3 ms to 15 ms in the same manner as that of the second DC period P2.

The third DC period P6 is provided immediately after the second DC period P5 and immediately before the mixing period P1 in the first driving period PH1. That is, the third DC period P6 is provided so as to be interposed between the second DC period P5 and the mixing period P1.

The third DC period P6 is a period for which the direct current having the current value Im1 is supplied to the discharge lamp 90 as the driving current I. The polarity of the direct current in the third DC period P6 is opposite to that of the direct current in the second DC period P5. That is, the direct current in the third DC period P6 is a direct current having the first polarity. The polarity of the direct current in the third DC period P6 is opposite to that of the direct current in the third DC period P3 of the first driving period PH1. In other words, the direct currents in the third DC periods in the adjacent driving periods have different polarities from each other. In the present embodiment, the direct current in the third DC period P6 has a constant current value (Im1).

A length t6 of the third DC period P6 is longer than or equal to the length t4b of the first DC period P4b in the mixing period P4 and shorter than the length t5 of the second DC period P5 in the same manner as that of the third DC period P3. The length t6 of the third DC period P6 is, for example, in the range of 1 ms to 10 ms.

The frequencies of the alternating currents in the AC periods P1a and P4a may be the same as or different from each other.

The numbers included in the lengths t1a and t4a and the mixing periods P1 and P4 of the AC periods P1a and P4a may be the same as or different from each other.

The numbers included in the lengths t1b and t4b and the mixing periods P1 and P4 of the first DC periods P1b and P4b may be the same as or different from each other.

The number of the AC periods Pal and P4a included in the mixing periods P1 and P4 may be the same as or different from the number of the first DC periods P1b and P4b included in the mixing periods P1 and P4.

The lengths t2 and t5 of the second DC periods P2 and P5 may be the same as or different from each other.

The lengths t3 and t6 of the third DC periods P3 and P6 may be the same as or different from each other.

Next, an increase in temperature of the first electrode 92 when the driving current I of the present embodiment is supplied to the discharge lamp 90 will be described.

First, in the mixing period P1 of the first driving period PH1, the temperature H of the first electrode 92 is gradually increased from H1 to H2 as illustrated in FIG. 7B because the direct current in the first DC period P1b has the first polarity.

Here, since the first polarity and the second polarity are alternately exchanged in the AC period P1a of the mixing period P1, the temperature H of both electrodes is easily held to be constant. As the frequency of the alternating current of the AC period P1a is increased, the temperature H of both electrodes is easily held to be constant. Specifically, as described above, it is preferable that the frequency of the AC period P1a is 1 kHz or more.

Next, in the second DC period P2, since the direct current having the same polarity as that of the direct current in the first DC period P1b of the mixing period P1 is supplied to the discharge lamp 90, the temperature H of the first electrode 92 is drastically increased and becomes Hmax.

Next, in the third DC period P3, since the direct current having the polarity (second polarity) opposite to that of the direct current in the second DC period P2 is supplied to the discharge lamp 90, the temperature H of the first electrode 92 is drastically decreased.

Next, in the mixing period P4 of the second driving period PH2, since the polarity of the direct current in the first DC period P4b is the second polarity, the temperature H of the first electrode 92 is gradually decreased.

Next, even in the second DC period P5, since the direct current of the second polarity is supplied to the discharge lamp 90, the temperature H of the first electrode 92 is drastically decreased and becomes Hmin.

Next, in the third DC period P6, since the polarity of the direct current is the first polarity, the temperature H of the first electrode 92 is drastically increased and becomes H1 from Hmin.

Moreover, in the mixing period P1 of the first driving period PH1 again, the temperature H of the first electrode 92 is gradually increased and the same temperature change is repeated hereinafter.

The change in temperature H of the second electrode 93 is symmetrical with the change in temperature H of the first electrode 92. Specifically, the temperature H of the second electrode 93 is changed in the same manner as that of the temperature H of the first electrode 92 in the second driving period PH2 illustrated in FIG. 7B in the first driving period PH1 and is changed in the same manner as that of the temperature H of the first electrode 92 in the first driving period PH1 illustrated in FIG. 7B in the second driving period PH2.

As described above, the control unit 40 of the present embodiment controls the discharge lamp driving unit 230 such that the current is supplied to the discharge lamp 90 according to respective periods described above.

Controlling of the discharge lamp driving unit 230 performed by the control unit 40 can be expressed as a discharge lamp driving method. That is, the method of driving a discharge lamp of the present embodiment is a method of supplying the driving current I to the discharge lamp 90 to be driven, and the driving current includes the first driving period PH1 and the second driving period PH2 having the mixing periods P1 and P4 which alternately have AC periods P1a and P4a for which the alternating current is supplied to the discharge lamp 90 and first DC periods P1b and P4b for which the direct current is supplied to the discharge lamp 90, second DC periods P2 and P5 which are provided immediately after the mixing periods P1 and P4 and for which the direct current having a polarity which is the same as that of the direct current in the first DC periods P1b and P4b is supplied to the discharge lamp 90, and third DC periods P3 and P6 which are provided immediately after the second DC periods P2 and P5 and for which the direct current having a polarity opposite to that of the direct current in the second DC periods P2 and P5 is supplied to the discharge lamp 90, and the length of the second DC periods P2 and P5 is longer than the length of the first DC periods P1b and P4b, and the length of the third DC periods P3 and P6 is longer than or equal to the length of the first DC periods P1b and P4b and shorter than the length of the second DC periods P2 and P5.

According to the present embodiment, the discharge lamp driving unit 230 is controlled such that the second DC period P2 is provided immediately after the mixing period P1 and the third DC period P3 is provided immediately after the second DC period P2. Since the second DC period P2 has the same polarity as that of the first DC period P1b in the mixing period P1, the temperature H of the first electrode 92 is drastically increased in the second DC period P2. Further, since the third DC period P3 has the polarity opposite to that of the first DC period P1b in the mixing period P1, the temperature H of the first electrode 92 is drastically decreased in the third DC period P3. In this manner, according to the present embodiment, the fluctuation in temperature H of the first electrode 92 can be made large in the third DC period P3.

The growth of projections on tips of the electrodes is controlled by repeating melting and solidifying of the electrodes. At this time, when the fluctuation in temperature added to the electrodes is small, the shape of the projections is unlikely to be controlled.

Meanwhile, according to the present embodiment, since the fluctuation in temperature added to the first electrode 92 can be made large in the manner described above, growth of the projection 552p of the first electrode 92 can be easily controlled. Therefore, according to the present embodiment, the service life of the discharge lamp can be improved.

In addition, since the value of the current supplied to the discharge lamp is small at the time of a low-power mode (eco-mode) or when the discharge lamp is deteriorated, it is difficult to increase the temperature of the electrodes and to allow the projections of the electrodes to grow. On the contrary, according to the present embodiment, since the fluctuation in temperature added to the first electrode 92 can be made large, the growth of the projection 552p of the first electrode 92 is easily controlled at the time of the low-power mode or when the discharge lamp is deteriorated. That is, the effect is particularly significant at the time of the low-power mode or when the discharge lamp is deteriorated in the present embodiment.

In addition, according to the present embodiment, the length t1b of the first DC period P1b is set to be smaller than the length t1a of the AC period P1a, larger than the length t1c of a half cycle of the AC period P1a, smaller than the length t2 of the second DC period P2, and in the range of 0.5 ms to 7.0 ms. In this manner, it is possible to prevent the first electrode 92 from being extremely melted and to increase the temperature of the first electrode 92. Hereinafter, the details will be described.

In the mixing period alternately having the alternating current and the direct current, when the length of a period for which the direct current is supplied is large, the temperature of the electrodes is rapidly increased and only the projections of the electrodes are extremely melted in some cases. In such a case, there is a concern that the growth of the projections is difficult, the electrodes are consumed, and thus, the service life of the discharge lamp is shortened when the projections melted due to a decrease in temperature of the electrodes are solidified again.

Meanwhile, according to the present embodiment, it is possible to suppress a drastic increase in the temperature H of the first electrode 92 by setting the length t1b of the first DC period P1b in the mixing period P1 in the above-described manner. It is considered that the reason is based on the following principle.

In the present embodiment, since the length t1b of the first DC period P1b is sufficiently small, the increased width of the temperature H of the first electrode 92 in the first DC period P1b is small. In this manner, it is possible to prevent the projection 552p from being extremely melted.

In addition, in the AC period P1a, the temperature H of the first electrode 92 is maintained and the temperature H of the first electrode 92 is increased again due to the first DC period P1b. In the present embodiment, since the length t1a of the AC period P1a is set to be longer than the length t1b of the first DC period P1b, a temperature gradient with respect to the time T of the first electrode 92 becomes gentle.

Further, in the case where the length t1b of the first DC period P1b is shorter than the length t1c of a half cycle of the AC period P1a, it is considered that the temperature H of the first electrode 92 is not increased or is decreased because the AC period P1a is largely affected compared to the first DC period P1b in terms of an increase in temperature H of the first electrode 92.

On the contrary, according to the present embodiment, since the length t1b of the first DC period P1b is longer than the length t1c of a half cycle of the AC period P1a, the temperature H of the first electrode 92 can be increased in the mixing period P1.

As described above, according to the present embodiment, it is possible to prevent the projection 552p of the first electrode 92 from being extremely melted in the mixing period P1 and to gradually increase the temperature H of the first electrode 92.

Further, since the electrodes of the discharge lamp are deteriorated with time and the projections are easily melted, it is difficult to control the extreme melting of the projections and the growth of the projections. Meanwhile, in the present embodiment, since extreme melting of the projection 552p can be prevented, a significant effect can be obtained when the discharge lamp 90 is deteriorated with time.

Further, in the present embodiment, for example, the length of each period may be changed in response to deterioration of the discharge lamp 90 and switching a driving mode to the low-power mode. More specifically, in the present embodiment, the length t2 of the second DC period P2 and the length t3 of the third DC period P3 may be increased in response to deterioration of the discharge lamp 90. By performing control in this manner, it is possible to allow the projection 552p of the first electrode 92 to grow appropriately according to a state in which the discharge lamp 90 is deteriorated. Further, in the present embodiment, the discharge lamp driving unit 230 may be controlled such that the length t1b of the first DC period P1b is decreased in response to the deterioration of the discharge lamp 90. By performing control in this manner, it is possible to appropriately increase the temperature H of the first electrode 92 within the range in which the projection 552P is not extremely melted in response to a change in ease of melting of the projection 552p.

Furthermore, in the embodiment described above, the length t1b of each first DC period P1b is set to be shorter than the length t1a of the AC period P1a, longer than the length t1c of a half cycle of the AC period P1a, shorter than the length t2 of the second DC period P2, and in the range of 0.5 ms to 7.0 ms, but the length thereof is not limited thereto. In the present embodiment, for example, the length t1b of the first DC period P1b may be set to be longer than 7.0 ms.

The entire disclosure of Japanese Patent Application No. 2014-047295, filed Mar. 11, 2014 is expressly incorporated by reference herein.

What is claimed is:

1. A discharge lamp driving device comprising:
a discharge lamp driving unit that supplies a driving current for driving a discharge lamp to the discharge lamp; and
a control unit that controls the discharge lamp driving unit,
wherein the control unit controls the discharge lamp driving unit such that the driving current having driving periods is supplied to the discharge lamp, the driving period including:
  a mixing period which alternately has an AC period in which an alternating current is supplied to the discharge lamp and a first DC period in which a direct current is supplied to the discharge lamp,
  a second DC period which is provided immediately after the mixing period and in which a direct current having a polarity which is the same as that of the direct current in the first DC period is supplied to the discharge lamp, and
  a third DC period which is provided immediately after the second DC period and in which a direct current having a polarity opposite to that of the direct current in the second DC period is supplied to the discharge lamp,
the length of the second DC period is longer than the length of the first DC period, and
the length of the third DC period is longer than or equal to the length of the first DC period and shorter than the length of the second DC period.

2. The discharge lamp driving device according to claim 1, wherein the driving current has a plurality of the driving periods, and
the direct currents in the first DC periods of the adjacent driving periods have different polarities from each other.

3. The discharge lamp driving device according to claim 1, wherein the length of the first DC period is shorter than the length of the AC period, longer than the length of a half cycle of the alternating current in the AC period, and is shorter than the length of the second DC period.

4. The discharge lamp driving device according to claim 3, wherein the length of the first DC period is equal to or greater than 0.5 ms and equal to or less than 7.0 ms.

5. The discharge lamp driving device according to claim 4, wherein the length of the first DC period is equal to or greater than 1.0 ms and equal to or less than 5.0 ms.

6. The discharge lamp driving device according to claim 1, wherein the number of the first DC periods included in the mixing period is equal to or greater than 5 and equal to or less than 50.

7. The discharge lamp driving device according to claim 1, wherein a frequency of the alternating current in the AC period is equal to or greater than 1 kHz.

8. The discharge lamp driving device according to claim 1, wherein the length of the AC period is equal to or greater than 1 cycle and equal to or less than 20 cycles.

9. A projector comprising:
a discharge lamp that emits light,
the discharge lamp driving device according to claim 1;
a light modulation element that modulates light emitted from the discharge lamp according to a video signal; and
a projection optical system that projects the light modulated by the light modulation element.

10. A projector comprising:
a discharge lamp that emits light,
the discharge lamp driving device according to claim 2;
a light modulation element that modulates light emitted from the discharge lamp according to a video signal; and
a projection optical system that projects the light modulated by the light modulation element.

11. A projector comprising:
a discharge lamp that emits light,
the discharge lamp driving device according to claim 3;
a light modulation element that modulates light emitted from the discharge lamp according to a video signal; and
a projection optical system that projects the light modulated by the light modulation element.

12. A projector comprising:
a discharge lamp that emits light,
the discharge lamp driving device according to claim 4;
a light modulation element that modulates light emitted from the discharge lamp according to a video signal; and
a projection optical system that projects the light modulated by the light modulation element.

13. A projector comprising:
a discharge lamp that emits light,
the discharge lamp driving device according to claim 5;
a light modulation element that modulates light emitted from the discharge lamp according to a video signal; and
a projection optical system that projects the light modulated by the light modulation element.

14. A projector comprising:
a discharge lamp that emits light,
the discharge lamp driving device according to claim 6;
a light modulation element that modulates light emitted from the discharge lamp according to a video signal; and
a projection optical system that projects the light modulated by the light modulation element.

15. A projector comprising:
a discharge lamp that emits light,
the discharge lamp driving device according to claim 7;
a light modulation element that modulates light emitted from the discharge lamp according to a video signal; and
a projection optical system that projects the light modulated by the light modulation element.

16. A projector comprising:
a discharge lamp that emits light,
the discharge lamp driving device according to claim 8;
a light modulation element that modulates light emitted from the discharge lamp according to a video signal; and
a projection optical system that projects the light modulated by the light modulation element.

17. A method of driving a discharge lamp that is driven by supplying a driving current to the discharge lamp, the method comprising:
supplying the driving current having driving periods to the discharge lamp, the driving period including:
  a mixing period which alternately has an AC period in which an alternating current is supplied to the discharge lamp and a first DC period in which a direct current is supplied to the discharge lamp,
  a second DC period which is provided immediately after the mixing period and in which a direct current having a polarity which is the same as that of the direct current in the first DC period is supplied to the discharge lamp, and a third DC period which is provided immediately after the second DC period and in which a direct current having a polarity opposite to that of the direct current in the second DC period is supplied to the discharge lamp, wherein the length of the second DC period is longer than the length of the first DC period, and the length of the third DC period is longer than or equal to the length of the first DC period and shorter than the length of the second DC period.

18. The method of driving a discharge lamp according to claim 17, wherein the driving current has a plurality of the driving periods, and the direct currents in the first DC periods of the adjacent driving periods have different polarities from each other.

* * * * *